United States Patent
Mason et al.

(10) Patent No.: US 7,542,756 B2
(45) Date of Patent: *Jun. 2, 2009

(54) APPARATUS AND METHOD FOR RESTORING A CONFERENCE CONNECTION TO A CELLULAR TELEPHONE

(75) Inventors: Andrew Mason, Sunnyvale, CA (US); Zeno Staemmer, Thalwil (CH)

(73) Assignee: Siemens Communications, Inc., Boca Raton, FL (US)

( * ) Notice: Subject to any disclaimer, the term of this patent is extended or adjusted under 35 U.S.C. 154(b) by 574 days.

This patent is subject to a terminal disclaimer.

(21) Appl. No.: 10/953,103

(22) Filed: Sep. 28, 2004

(65) Prior Publication Data

US 2007/0232284 A1    Oct. 4, 2007

(51) Int. Cl.
*H04Q 7/20*   (2006.01)
(52) U.S. Cl. .................... 455/416; 455/423; 455/414.1; 455/445; 455/426.1; 455/418; 379/202.01; 370/260; 709/224
(58) Field of Classification Search ......... 455/415–416, 455/414.1, 405–406, 445, 423, 567, 418–420, 455/422.1, 426.1–426.2, 67.11; 379/88.01, 379/211.01–211.03, 207.12, 207.01, 158–159; 370/260–261
See application file for complete search history.

(56) References Cited

U.S. PATENT DOCUMENTS

| 6,032,040 | A | * | 2/2000 | Choy et al. ............. 455/414.1 |
|---|---|---|---|---|
| 6,275,713 | B1 | * | 8/2001 | Toda ........................... 455/564 |
| 6,445,921 | B1 | * | 9/2002 | Bell .......................... 455/426.1 |
| 6,535,730 | B1 | * | 3/2003 | Chow et al. .................. 455/416 |
| 6,608,820 | B1 | * | 8/2003 | Bradshaw, Jr. .......... 379/201.01 |
| 6,658,095 | B1 | | 12/2003 | Yoakam |
| 6,757,722 | B2 | | 6/2004 | Lönnfors et al. |
| 6,970,547 | B2 | | 11/2005 | Andrews et al. |
| 7,085,809 | B2 | * | 8/2006 | Mori et al. ................... 709/203 |
| 2001/0056473 | A1 | * | 12/2001 | Arneson et al. ............. 709/217 |
| 2002/0129282 | A1 | * | 9/2002 | Hopkins ..................... 713/201 |
| 2004/0059781 | A1 | | 3/2004 | Yoakum et al. |
| 2004/0062383 | A1 | | 4/2004 | Sylvain |
| 2004/0122901 | A1 | | 6/2004 | Sylvain |
| 2004/0125941 | A1 | | 7/2004 | Yoakum et al. |
| 2004/0177119 | A1 | * | 9/2004 | Mason et al. ............... 709/206 |
| 2004/0235509 | A1 | * | 11/2004 | Burritt et al. ................ 455/519 |
| 2005/0048981 | A1 | * | 3/2005 | Anupam et al. ............ 455/445 |
| 2006/0075038 | A1 | * | 4/2006 | Mason et al. ............... 709/206 |
| 2006/0128388 | A1 | * | 6/2006 | Mason et al. ............... 455/445 |
| 2006/0177034 | A1 | * | 8/2006 | Reding et al. .......... 379/211.02 |
| 2007/0067439 | A1 | * | 3/2007 | Mason et al. ............... 709/224 |
| 2007/0081658 | A1 | * | 4/2007 | Blohm et al. ............... 379/272 |

FOREIGN PATENT DOCUMENTS

WO    WO 01/52513 A1    7/2001

* cited by examiner

*Primary Examiner*—Kamran Afshar (57) ABSTRACT

A telecommunication system has capabilities for managing conference telephone calls. Cellular telephones may be registered to the system and may be used as contact devices in setting up conference telephone calls. When a cellular telephone is participating in a conference telephone call and drops out because, e.g., of lost signal, the system may automatically initiate a call back to re-connect the cellular telephone to the conference telephone call.

12 Claims, 10 Drawing Sheets

APPARATUS AND METHOD FOR RESTORING A CONFERENCE CONNECTION TO A CELLULAR TELEPHONE

TECHNICAL FIELD

The present disclosure relates generally to telephony and more specifically to management of conference telephone calls.

BACKGROUND

When a business meeting or discussion is needed among three or more participants, it is often more convenient for the discussion to occur via a conference telephone call rather than in a face-to-face meeting of all participants. With the advent and wide-spread use of cellular telephones, one or more of the participants may be connected to the conference telephone call via a cellular telephone rather than a conventional land-line telephone. Consequently, participants may be connected to a conference telephone call even when traveling or when otherwise away from their offices or from any land-line telephone.

A disadvantage of a cellular telephone, particularly when being used while traveling or moving, is that the wireless connection to the cellular telephone may be broken without warning due to circumstances such as changes in network conditions, or because the user of the cellular telephone has entered a building, a tunnel, etc. If the user is a participant in a conference telephone call at the time the signal connection is broken, the participant's involvement in the conference telephone call may be disrupted.

SUMMARY

Apparatus and methods are therefore presented for improved management of conference telephone calls.

According to some embodiments, a method of operating a conference telephone call system is provided. According to the method, a conference telephone call is established. The conference telephone call has at least three participants. One of the participants participates in the conference telephone call via a cellular telephone. During the conference telephone call, it is detected that the signal channel to the cellular telephone is broken. The system automatically responds to the detection of the breaking of the signal channel to the cellular telephone by initiating a telephone call to the cellular telephone to re-connect the cellular telephone to the conference telephone call.

According to some embodiments, a method includes receiving a request to include a participant in a conference telephone call. It is determined that the participant is to be reached via a cellular telephone. A telephone call is initiated to the cellular telephone. It is detected that the telephone call is answered. An option is presented to the participant. The option permits the participant to indicate that the cellular telephone is to be automatically called back to re-connect to the conference telephone call if a signal channel to the cellular telephone is broken during the conference telephone call.

BRIEF DESCRIPTION OF THE DRAWINGS

Further aspects of the instant methods and apparatus will be more readily appreciated upon review of the detailed description of the preferred embodiments included below when taken in conjunction with the accompanying drawings, of which.

DETAILED DESCRIPTION

According to some embodiments, a collaboration-based communication system makes it easy for a cellular telephone that has dropped out from a telephone conference call to be re-connected to the conference telephone call. When a user identifies one of his/her contact devices as a cellular telephone, and the cellular telephone is then used as the contact device for a conference telephone call, the system queries the user as to whether the user desires to be automatically called back if he/she is dropped from the conference telephone call as a result of a break in the signal path to the cellular telephone. If the user so opts, then, in the event of the user dropping from the conference telephone call, the system automatically initiates a call-back to the cellular telephone and provides the user with an option to be re-connected to the conference telephone call. If the user then so elects, the cellular telephone is re-connected to the conference telephone call In this way, it may be possible to mitigate disruption of a cellular telephone user's participation in a telephone conference call, notwithstanding interruption in the signal channel to the cellular telephone Turning now to the drawings and, with particular attention to FIG. 1, a diagram of an exemplary telecommunications system 100 according to an embodiment of the present invention is shown. As shown, the telecommunication system 100 includes a local area network (LAN) 102. The LAN 102 may be implemented using a TCP/IP network and may implement voice or multimedia over IP using, for example, the Session Initiation Protocol (SIP). Operably coupled to the local area network 102 is a server 104. Although only one server 104 is shown coupled to the LAN 102, in practice two or more servers 104 may be coupled to the LAN 102, and may include a live communication server (LCS; not separately shown) to operate with LCS software available from Microsoft, a server (not separately shown; possibly including a co-processor) to run the "OpenScape" software available from Siemens Information and Communication Networks, Inc. (which is the assignee hereof), a media server (not separately shown) which performs functions such as voice mail, speech recognition, etc., and a multipoint control unit (MCU). In some embodiments, one or more of these functions may be performed on one or more of the server(s) 104. One or more of these servers or another server (not separately shown) coupled to the LAN 102 may also perform presence monitoring with respect to users of the system 100.

Figure 1:
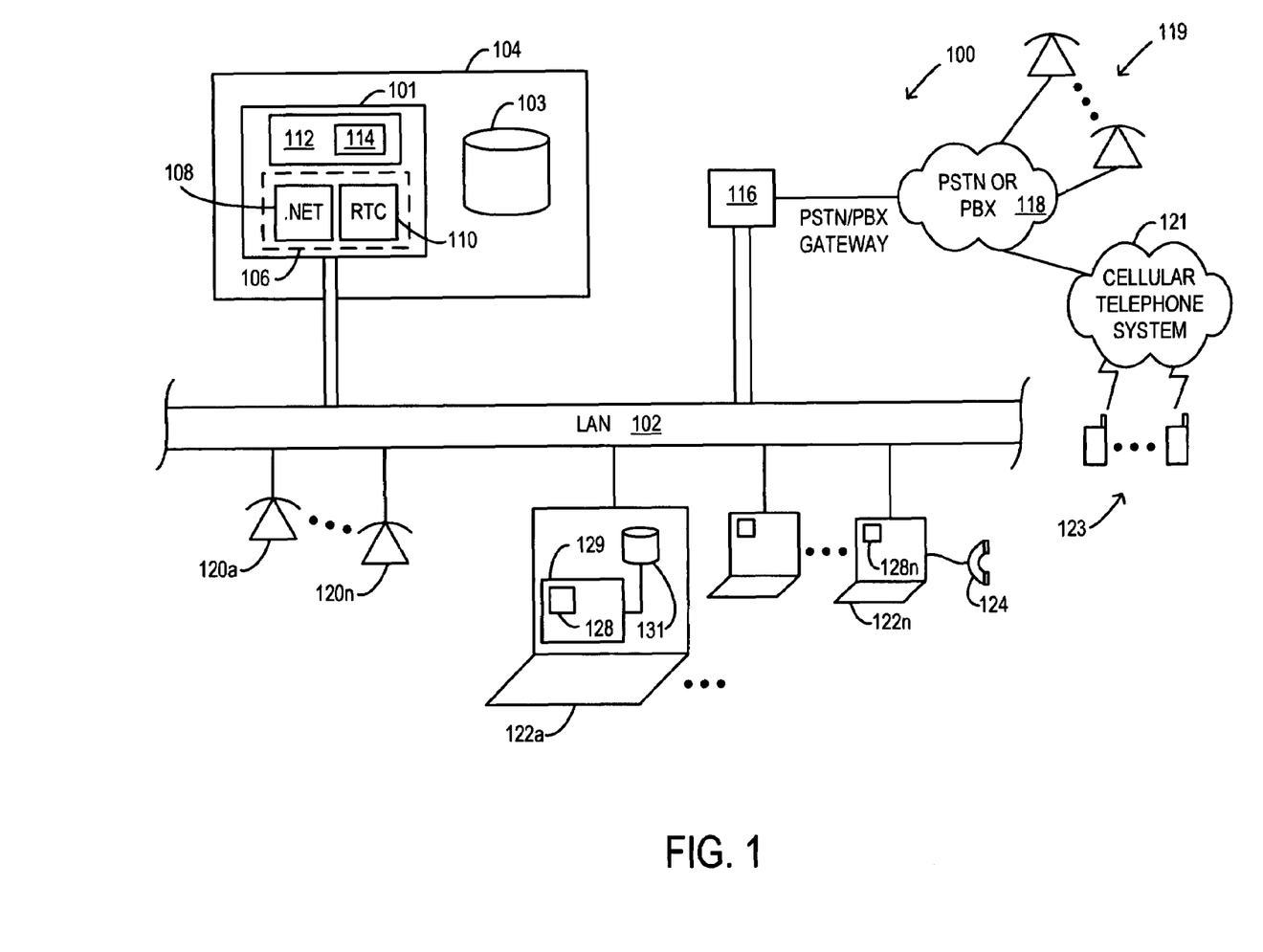
FIG. 1 is a diagram of a telecommunication system according to an embodiment of the present invention.

The server 104 may include one or more controllers 101, which may be embodied as one or more microprocessors, and memory 103 for storing application programs and data. The controller 101 implements an instant messaging system 106. The instant messaging system may be embodied as Microsoft Windows Messenger or other instant messaging system. Thus, according to certain embodiments of the present invention, the instant messaging system 106 implements the Microsoft.Net environment 108 and Real Time Communications protocol (RTC) 110.

In addition, according to embodiments of the present invention, a collaboration system 114 may be provided, which may be part of an interactive suite of applications 112, run by controller 101, as will be described in greater detail below.

Also coupled to the LAN 102 is a gateway 116 which may be implemented as a gateway to a private branch exchange (PBX), the public switched telephone network (PSTN) 118, or any of a variety of other networks, such as a wireless or cellular network. Land-line telephones 119 are shown explicitly connected to PSTN/PBX 118, as are one or more cellular telephone systems 121, which support cellular telephones 123. In addition, one or more LAN telephones 120*a*-120*n* and one or more computers 122*a*-122*n* may be operably coupled to the LAN 102.

The computers 122*a*-122*n* may be personal computers implementing the Windows XP operating system and thus, Windows Messenger. In addition, the computers 122*a*-122*n* may include telephone and other multimedia messaging capability using, for example, peripheral cameras, microphones and speakers (not shown) or peripheral telephone handsets 124, such as the Optipoint handset, available from Siemens Corporation. In other embodiments, one or more of the computers may be implemented as wireless telephones, digital telephones, or personal digital assistants (PDAs). Thus, the figures are exemplary only. As shown with reference to computer 122*a*, the computers may include one or more controllers 129, such as Pentium-type microprocessors, and storage 131 for applications and other programs.

Finally, the computers 122*a*-122*n* may implement Interaction Services 128*a*-128*n* according to embodiments of the present invention. As will be described in greater detail below, the Interaction Services 128*a*-128*n* allow for interworking of phone, buddy list, instant messaging, presence, collaboration, calendar and other applications.

Figure 2:
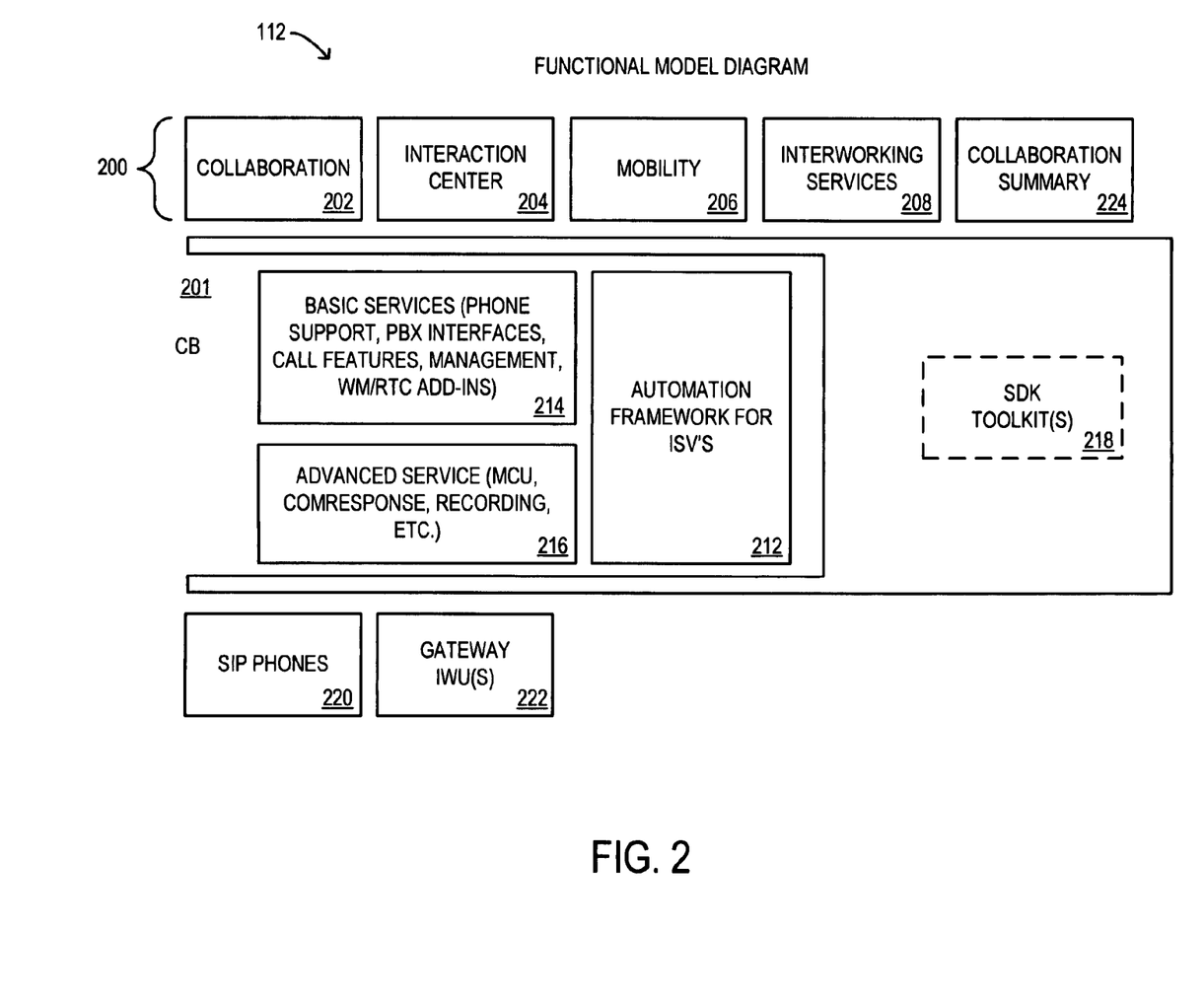
FIG. 2 is a diagram illustrating a telecommunication collaboration system according to an embodiment of the present invention.

Turning now to FIG. 2, a functional model diagram illustrating collaboration system 114 is shown. More particularly, FIG. 2 is a logical diagram illustrating a particular embodiment of a collaboration server 104. The server 104 includes a plurality of application modules 200 and a communication broker module 201. One or more of the application modules and communication broker module 201 may include an inference engine, i.e., a rules based artificial intelligence engine for implementing various functions of the collaboration server. In addition, the server 104 provides interfaces, such as APIs (application programming interfaces) to SIP phones 220 and gateways/interworking units 222.

According to the embodiment illustrated, the broker module 201 includes a basic services module 214, an advanced services module 216, an automation module 212, and a toolkit module 218.

The basic services module 214 functions to implement, for example, phone support, PBX interfaces, call features and management, as well as Windows Messaging and RTC add-ins, when necessary. The phone support features allow maintenance of and access to buddy lists and provide presence status.

The advanced services module 216 implements functions such as presence, multipoint control unit (MCU), recording, and the like. MCU functions are used for voice conferencing and support ad hoc and dynamic conference creation from a buddy list following the SIP conferencing model for ad hoc conferences. Telephone conference call set-up and management functions include capabilities for re-connecting dropped cellular telephones to conference telephone calls, as described in more detail below. In certain embodiments, support for G.711 and G.723.1 codecs is provided. Further, in certain embodiments, the MCU can distribute media processing over multiple servers using the MEGACO protocol.

Presence features provide device context for both SIP registered devices and user-defined non-SIP devices. Various user contexts, such as In Meeting, On Vacation, In the Office, etc., can be provided for. In addition, voice, e-mail and instant messaging availability may be provided across the user's devices. The presence feature enables real time call control using presence information, e.g., to choose a destination based on the presence of a user's devices. In addition, various components have a central repository for presence information and for changing and querying presence information. In addition, the presence module provides a user interface for presenting the user with presence information.

In addition, the broker module 201 may include the ComResponse platform available from Siemens Information and Communication Networks, Inc. ComResponse features include speech recognition, speech-to-text, and text-to-speech, and allow for creation of scripts for applications.

In addition, real time call control is provided by a SIP API 220 associated with the basic services module 214. That is, calls can be intercepted in progress and real time actions performed on them, including directing those calls to alternate destinations based on rules and/or other stimuli. The SIP API 220 also provides call progress monitoring capabilities and provides for reporting status of such calls to interested applications. The SIP API 220 also provides for call control from the user interface.

According to the embodiment illustrated, the application modules include a collaboration module 202, an interaction center module 204, a mobility module 206, and interworking services module 208, and a collaboration summarization module 224.

The collaboration module 202 allows for creation, modification or deletion of a collaboration session for a group of users. The collaboration module 202 may further allow for invoking a voice conference from any client. In addition, the collaboration module 202 can launch a multi-media conferencing package, such as the WebEx package. It is noted that the multi-media conferencing can be handled by other products.

The interaction center 204 provides a telephony interface for both subscribers and guests. Subscriber access functions include calendar access and voicemail and e-mail access. The calendar access allows the subscriber to accept, decline, or modify appointments, as well as block out particular times. The voicemail and e-mail access allows the subscriber to access and sort messages.

Similarly, the guest access feature allows the guest access to voicemail for leaving messages and calendar functions for scheduling, canceling, and modifying appointments with subscribers. Further, the guest access feature allows a guest user to access specific data meant for them, e.g., receiving e-mail and fax back, etc.

The mobility module 206 provides for message forwarding and "one number" access across media, and message "morphing" across media for the subscriber. Further, various applications can send notification messages to a variety of destinations, such as e-mails, instant messages, pagers, and the like. In addition, the subscriber can set rules that the mobility module 206 uses to define media handling, such as e-mail, voice and instant messaging handling. Such rules specify data and associated actions. For example, a rule could be defined to say "If I'm traveling, and I get a voicemail or e-mail marked Urgent, then page me."

Figure 3:
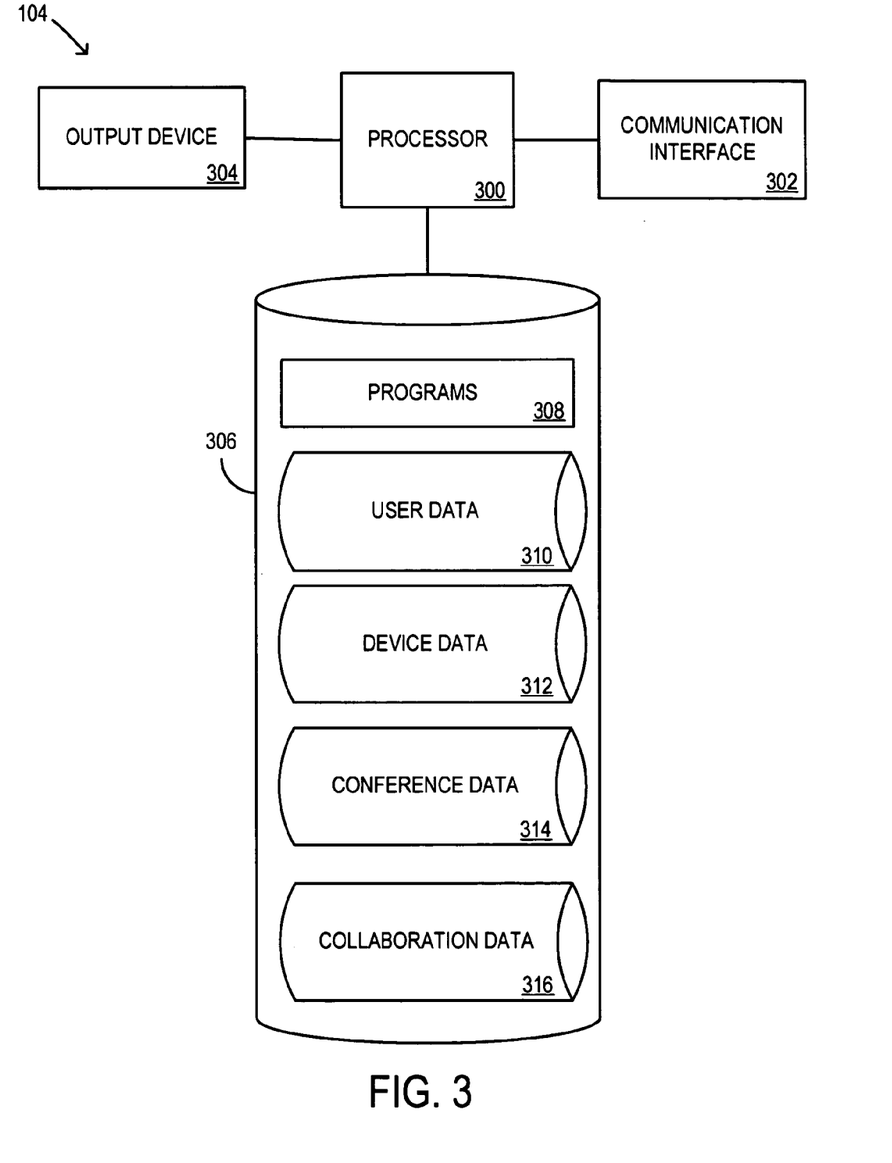
FIG. 3 is a diagram of a server computer that is part of the telecommunication system of FIG. 1.

FIG. 3 is a diagram that illustrates the server 104 in hardware terms. As seen from FIG. 3, the server 104 includes a processor 300, which may, for example, be constituted by one or more conventional microprocessors. The server 104 also includes a communication interface 302 which is coupled to the processor 300 and which allows the processor 300 to send and receive data communications via the LAN 102 and/or to exchange data with other components of the system 100. One or more output device(s) 304 coupled to the processor 300 are also included in the server 104. The output device(s) 304 may, for example, include one or more printers and/or display monitors. (Although not shown, the server 104 may also include one or more input devices, such as keyboards and computer mice, coupled to the processor to allow human operators to provide input directly to the server 104.)

The server 104 further includes a storage device 306, which may be constituted by one or more, or a combination of, magnetic, solid state and optical storage devices, such as one or more hard disk drives, as well as ROM (read only memory) and RAM (random access memory). The storage device(s) 306 may store programs 308 which include instructions to control the processor 300 and/or the system 100 to perform all or at least some of the functions described hereinabove and hereinbelow.

The storage device(s) 306 may further store user data 310 which identifies users who have privileges to interact with the system 100. Usernames, passwords, levels of access, etc., may be stored as part of the user data 310.

The storage device(s) 306 may also store device data 312 that identifies devices such as land-line telephones, cellular telephones, pagers, PDAs, computers, etc. by which messaging may be provided or communication channels may be opened for users listed in the user data 310. In some embodiments, the device data 312 may be integrated with the user data 310.

The storage device(s) 308 may also store conference data 314. The conference data 314 may include data concerning conference telephone calls that are currently taking place, such as the names of the participants and identifying data (e.g., telephone numbers) for the devices in use by the participants for the telephone conference calls. In some cases, the conference data 314 may indicate whether users connected to the conference telephone calls via cellular telephones have opted to be called back automatically to reconnect to the conference telephone calls in the event that the connection with the cellular telephone is broken during the conference telephone call. The conference data 314 may also include historical data concerning conference telephone calls that have previously occurred and/or pre-configuration data to facilitate rapid set-up of future conference telephone calls.

The storage device(s) 308 may also store collaboration data 316. The collaboration data 316 may include data concerning present or past multi-media collaboration sessions. The collaboration data 316 may include such information as the names of the participants, the addresses of their computers, and the nature of the data being exchanged during the collaboration session. In addition, the collaboration data 316 may include pre-configuration data to facilitate rapid set-up of future multi-media collaboration sessions.

The storage device 308 may also store other data and programs which are not indicated in FIG. 3, including data and programs in accordance with the OpenScape software system available from the assignee hereof.

Figure 4:
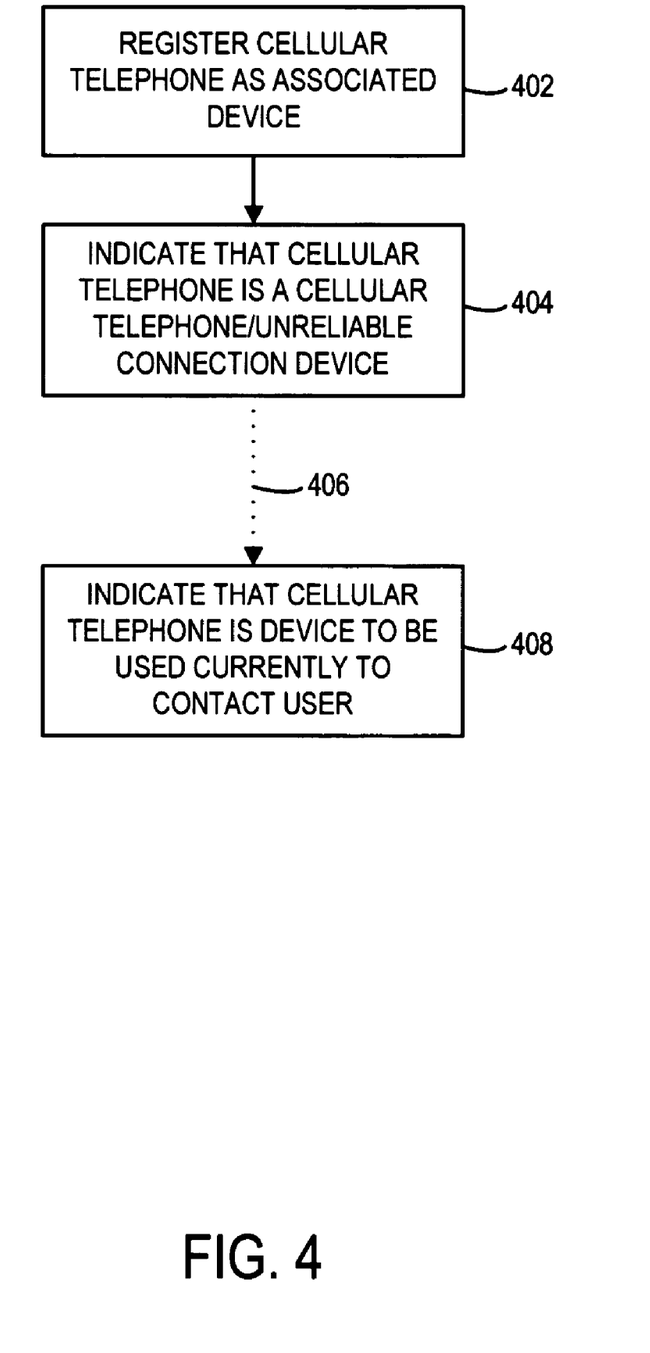
FIG. 4 is a flow diagram that illustrates a process by which a cellular telephone may be registered with, and designated as a user's primary contact for, the system of FIG. 1.

FIG. 4 is a flow diagram that illustrates a process that may be performed in the system 100 to allow a user to register a cellular telephone as a device by which the user may be contacted for voice communication sessions, including conference telephone calls.

Figure 5:
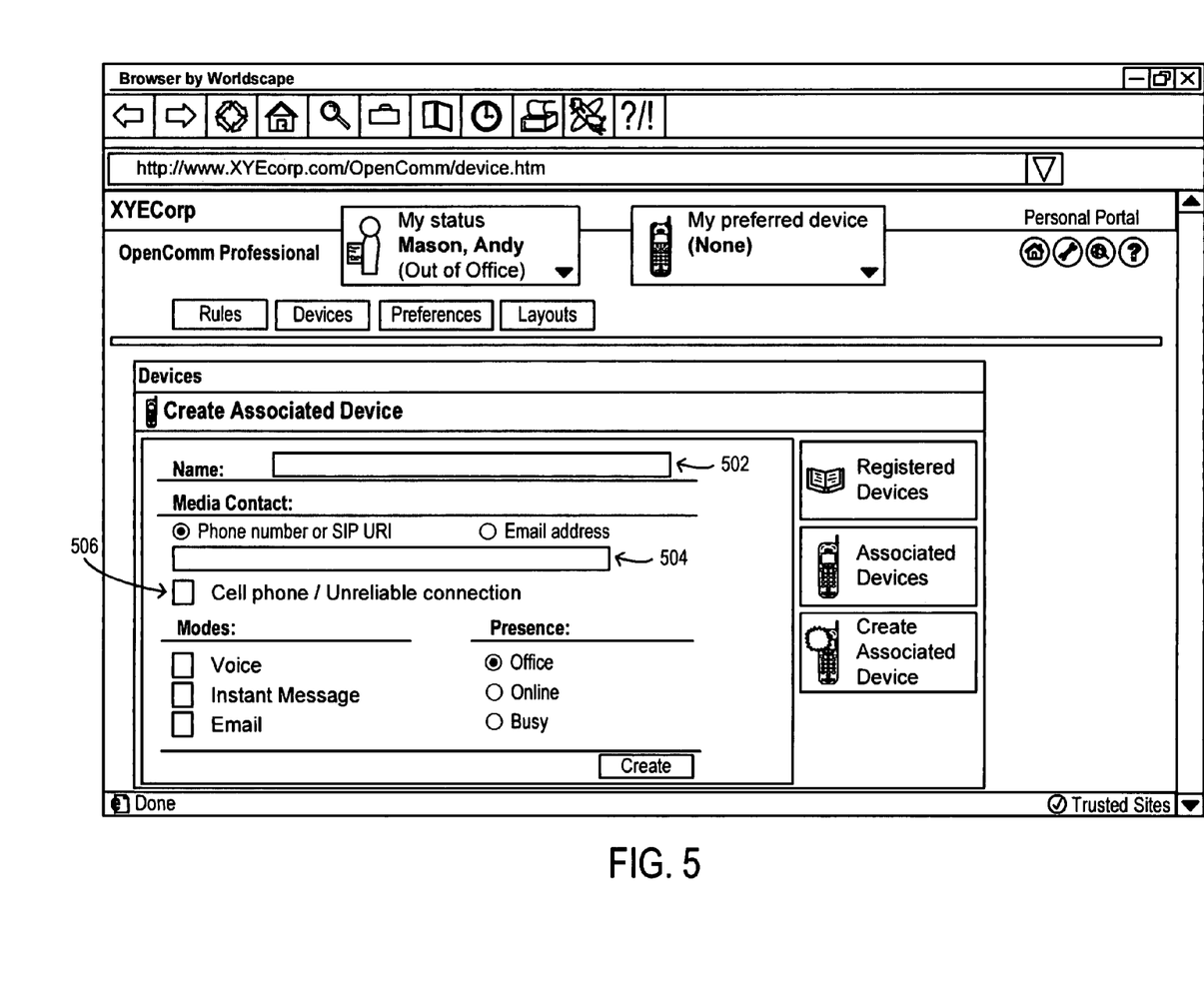
FIG. 5 is a representative view of a webpage provided by the system of FIG. 1 to facilitate registering of a communication device with the system.

Initially in the process of FIG. 4, at 402, a user registers his/her cellular telephone with the system as a communication device to be associated with the user by the system. FIG. 5 is an example display of a webpage that may be accessed by the user to accomplish registration of the cellular telephone. The webpage represented in FIG. 5 may be displayed on a display component of one of the computers 122 or on a display component of any other device that has access to the server 104. The display of FIG. 5 includes a "name" field 502 into which the user may enter a string of alphanumeric characters (not shown) to designate a name for the device now being registered. For example, the user may enter a name designation such as "mobile" or "cellular" in the field 502. The display of FIG. 5 further includes a contact address field 504 into which the user may enter numeric data such as the telephone number for the communication device currently being registered.

Further, in accordance with an aspect of the present invention, the display of FIG. 5 may include a checkbox 506, which may be checked by the user to indicate that the communication device currently being registered is a cellular telephone or other device that may exhibit an unreliable connection. (As used herein and in the appended claims, indicating that a communication device is a cellular telephone shall also be construed to include indicating that the communication device is any type of device which exhibits an unreliable connection.)

Referring once more to FIG. 4, it is indicated at 404 that the user indicates to the system that the communication device currently being registered is a cellular telephone, which may be done by checking the checkbox 506 of the display of FIG. 5. The user may thereafter enter other information and/or select other data entry options in the display of FIG. 5, upon which registration of the cellular telephone is complete. The information entered via the display of FIG. 5 may be stored by the system in the device data 312 referred to in connection with FIG. 3.

On a later occasion, as indicated by ellipsis/arrow 406, the user may indicate (block 408 in FIG. 4) to the system that the cellular telephone should be considered by the system as the communication device to which all telephone calls for the user are to be directed. This may be done in conjunction with a conventional "one number" telephone access feature. A suitable occasion for the user to designate his/her cellular phone as the telephone point of contact may be when the user is about to leave his/her office for a business trip during which the user will have the cellular telephone with him/her.

Figure 6A:
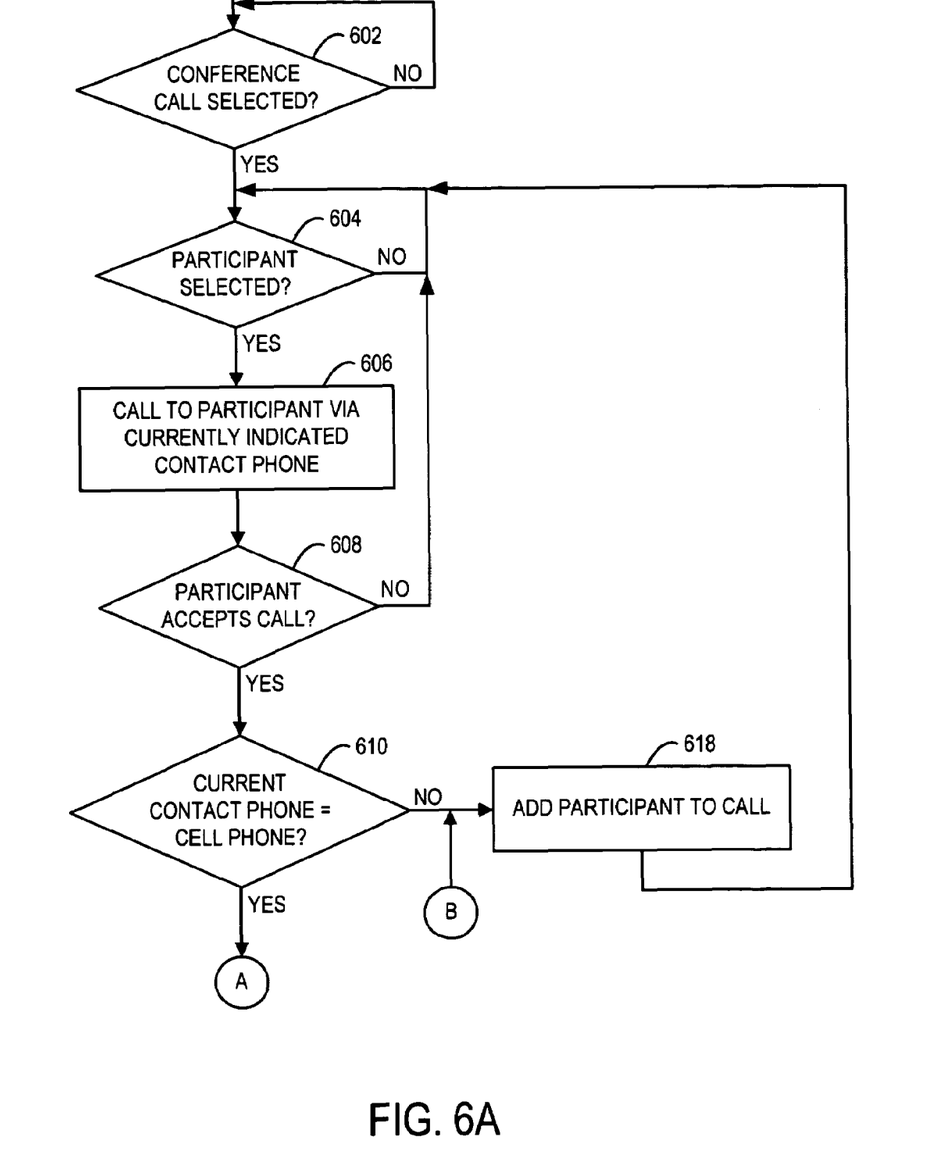
FIGS. 6A and 6B together form a flow diagram that illustrates a process performed in the system of FIG. 1 to establish a conference telephone call.
Figure 6B:
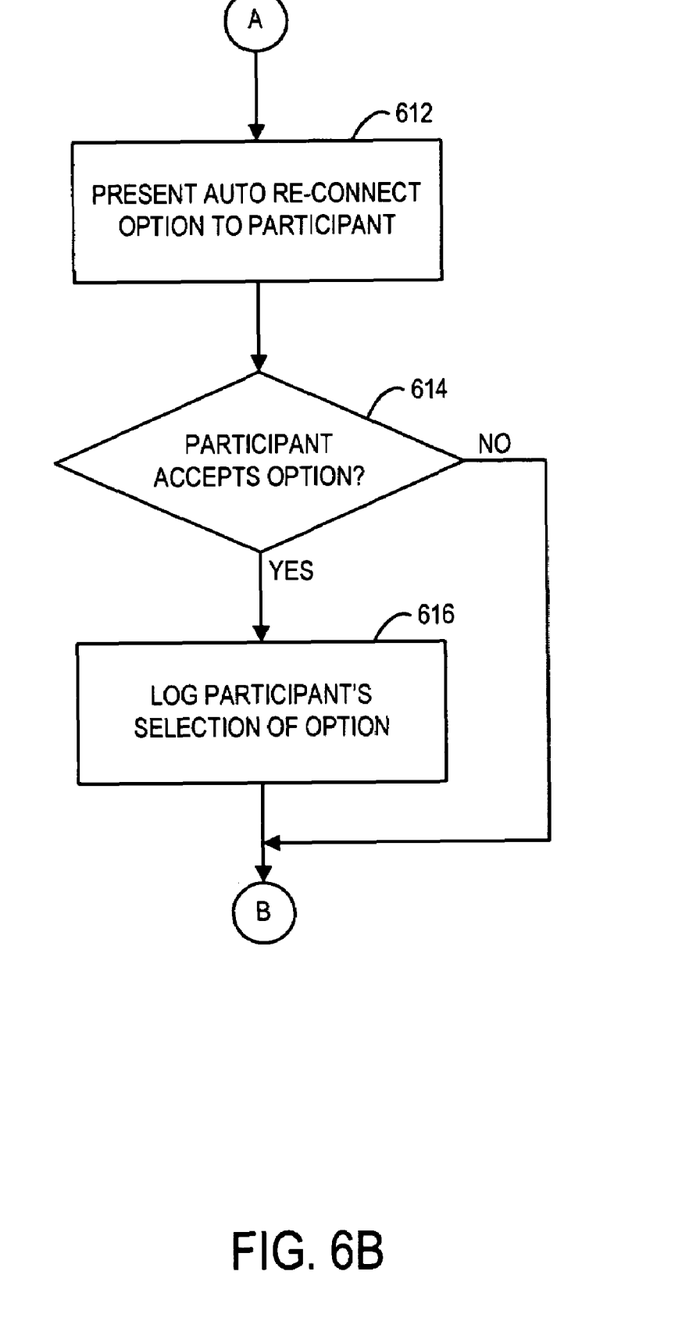

FIGS. 6A and 6B together form a flow diagram that illustrates a process performed in the system 100 to establish a conference telephone call.

Figure 7:
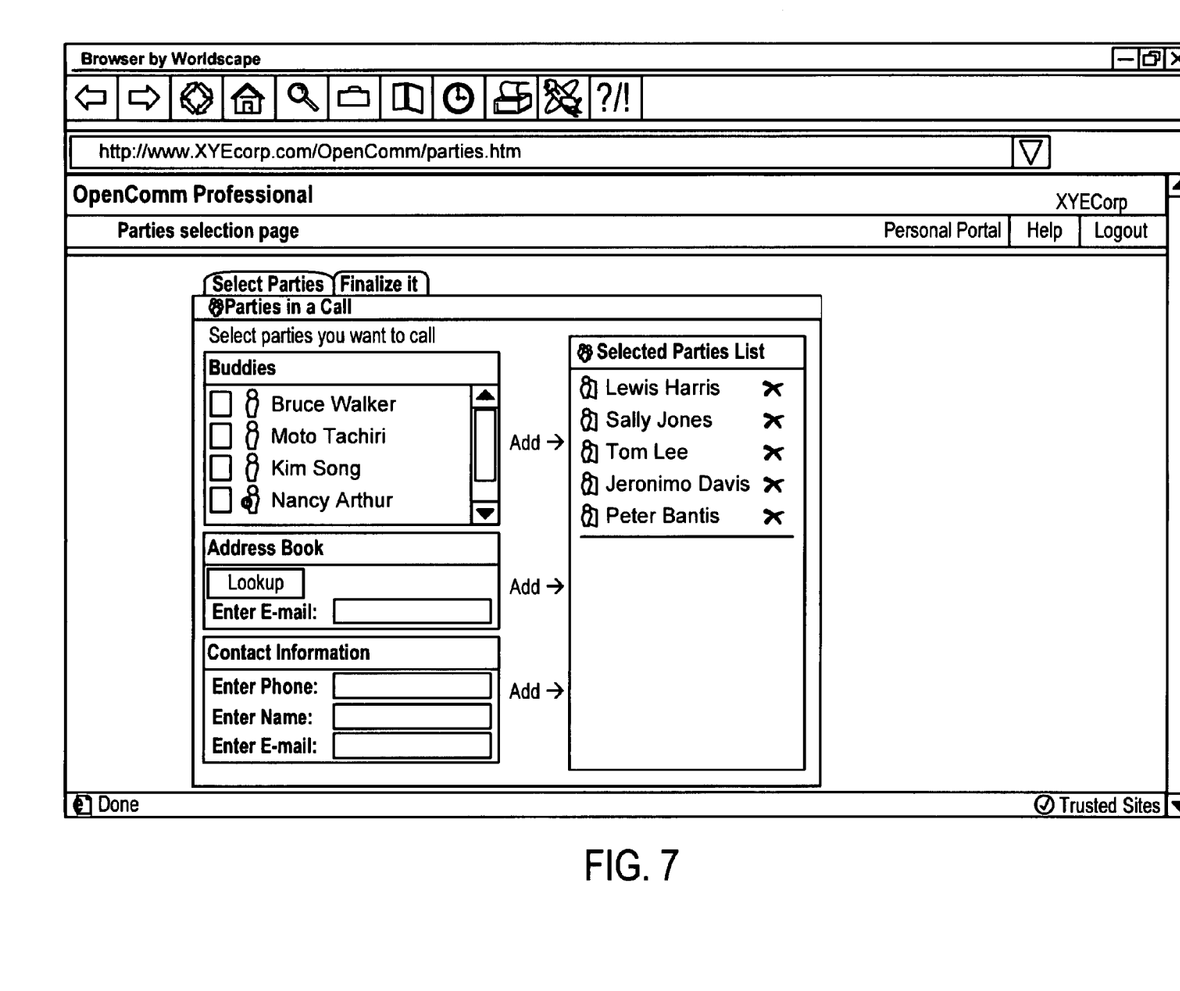
FIG. 7 is a representative view of a webpage provided by the system of FIG. 1 to facilitate establishing of a conference telephone call.

Initially, at 602 in FIG. 6A, it is determined whether a user (who need not be the same user referred to in connection with FIGS. 4 and 5) selects a function of the system 100 to set up an ad hoc or pre-scheduled conference telephone call. Next, at 604, it is determined whether a participant for the conference telephone call is selected by the user. Selection of participants for a conference telephone call may in some embodiments be performed by interacting with a web page display such as that shown in FIG. 7. (The webpage represented in FIG. 7 may be displayed on a display component of one of the computers 122 or on a display component of any other device that has access to the server 104.) That is, it is determined whether a request is received from the user to include a particular participant in the conference telephone call. If so, the system determines the telephone number which has been currently designated by the selected participant as the current telephone number contact for the participant. The system then initiates a telephone call, as indicated at 606 in FIG. 6A, to the device which corresponds to the selected participant's currently designated contact telephone number. When the telephone call is answered, the system detects answering of the call, and the system then transmits to the telephone (or other answering device) an automatically generated voice announcement to advise the selected participant that the selected participant is being invited to join in a conference telephone call. The announcement may also present the participant with an option to accept or decline the conference telephone call. For example, the announcement may say: "Press 1 to accept the conference call; press 2 to decline the conference call." In some embodiments, in addition to or instead of indicating acceptance or non-acceptance of the conference telephone call by a keypad entry of data, the participant may be permitted to indicate acceptance or non-acceptance of the conference telephone call by voice input to be recognized by the system by speech recognition.

It is next determined at 608 whether the participant selected at 604 accepts the conference telephone call. This may be done by receiving a keypad data entry from the selected participant and/or by voice recognition, as indicated above. If the participant accepts the conference telephone call, the system may next determine, as indicated at 610, whether the communication device by which the participant was contacted at 606 was indicated to be a cellular telephone. This determination may be made by reference to the device data 312 (FIG. 3) and may reflect whether or not the participant selected the checkbox 506 (FIG. 5) while registering the communication device in question.

If a positive determination is made at 610 (i.e., if it was determined that the current contact device for the selected participant was indicated to be a cellular telephone), then block 612 (FIG. 6B) may follow. At block 612, the system may present to the participant an option by which the participant is permitted to indicate that the communication device in question is to be automatically called back to re-connect to the conference telephone call if the signal channel to the communication device in question is broken during the conference telephone call. For example, the system may transmit to the device at block 612 an automatically generated voice prompt such as, "Press 1 to accept auto re-connect option; press 2 to decline auto re-connect." In addition, or alternatively, the participant may be prompted to indicate acceptance or non-acceptance of this option by voice input from the participant to be recognized by the system by speech recognition.

In an alternative embodiment, the system determines, at least as soon as the call made at 606 (FIG. 6A), whether the currently designated voice contact communication device for the selected participant has been indicated as a cellular telephone, and the options presented to the selected participant in response to the answering of the call made at 606 may include the auto re-connect option if the currently designated communication device was indicated to be a cellular telephone. For example, the initial prompt to the participant may be as follows in this alternative embodiment: "Press 2 to decline the conference call; press 3 to accept the conference call with the auto re-connect option; press 1 to accept the conference call without the auto re-connect option."

Following block 612 (FIG. 6B), it is determined at 614 whether the participant accepts the auto re-connect option. (Alternatively, this determination may be made based on the participant's response to the initial prompt in the alternative embodiment described in the preceding paragraph.) If a positive determination is made at 614 (i.e., if it is determined that the participant accepts the auto re-connect option), then as indicated at 616 the system logs the fact that the participant has accepted the auto re-connect option. This information may, for example, be stored in the conference data 314 referred to above in connection with FIG. 3.

Next, at 618 (FIG. 6A), the selected participant is connected to the conference telephone call now being established, and the process loops back to 604 to determine the selection of the next participant.

If a negative determination is made at 614 (i.e., if the participant declines the auto re-connect option), then the process skips 616 while advancing to 618, and accordingly there is no logging of data to indicate acceptance of the auto re-connect option.

If a negative determination is made at 610 (i.e., if the currently designated contact communication device has not been indicated to be a cellular telephone), then the process advances to 618 from 610 and the selected participant is added to the conference telephone call without presenting the participant with the auto-reconnect option.

If a negative determination is made at 608 (i.e., if the selected participant declines to participate in the conference telephone call), then the process loops back to 604 without adding to the conference telephone call the participant called at 606.

As used herein and in the appended claims, the term "connect telephone call" refers to the call made at 606 and/or includes a telephone call made to a cellular telephone to allow the cellular telephone to be connected to a conference telephone call.

Figure 8A:
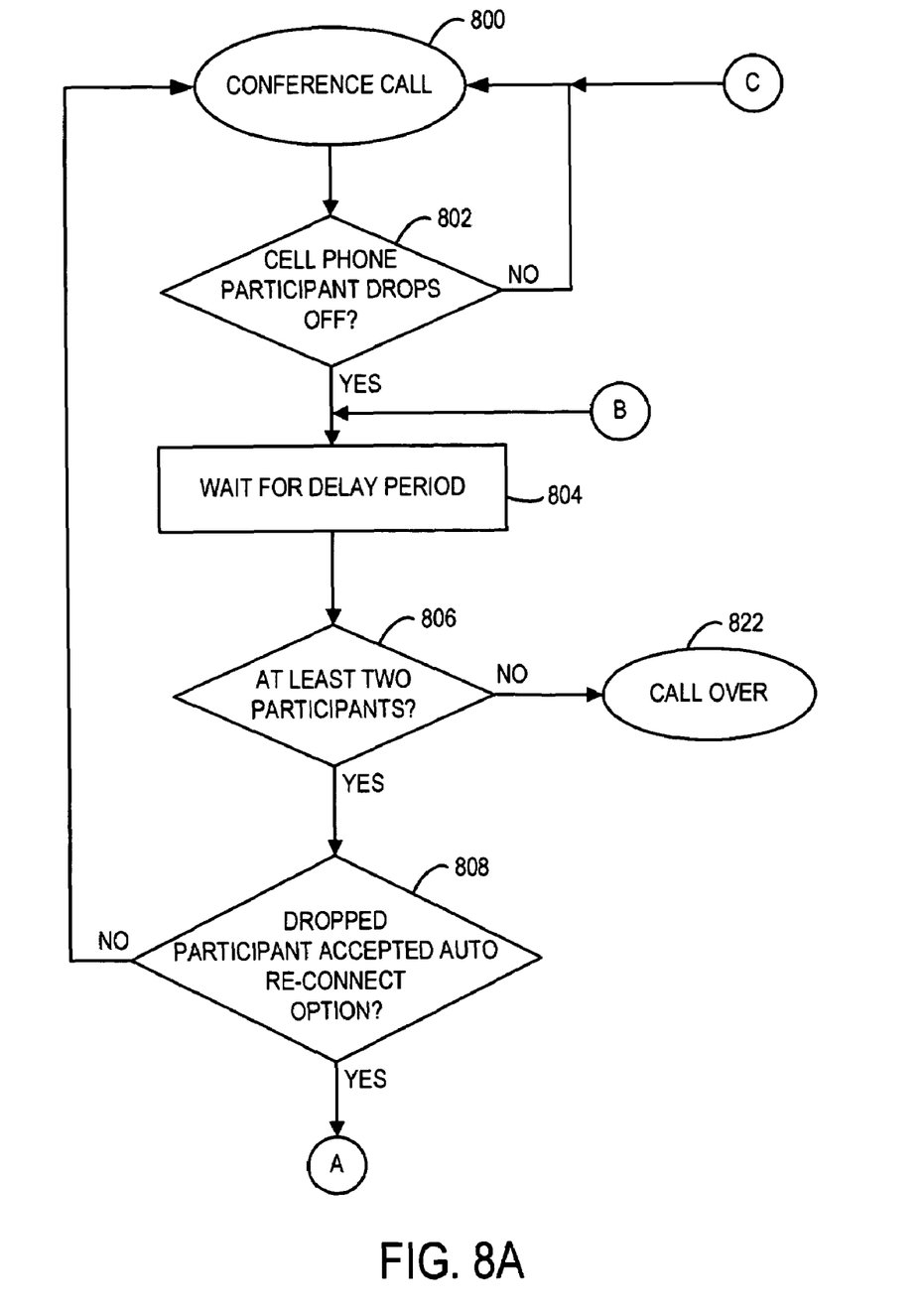
FIGS. 8A and 8B together form a flow diagram that illustrates a process performed in the system of FIG. 1 to restore a cellular telephone to connection with a conference telephone call.
Figure 8B:
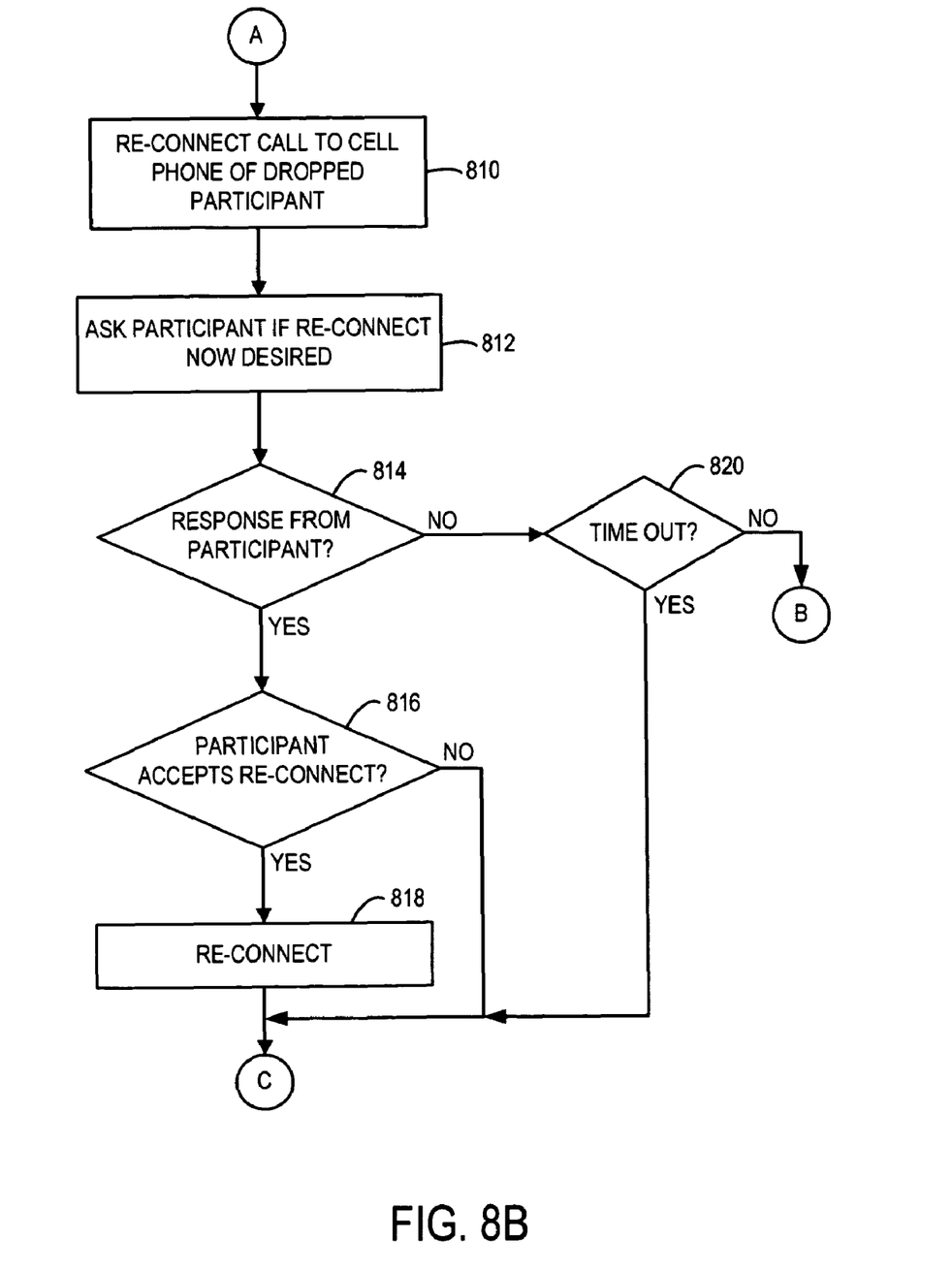

FIGS. 8A and 8B together form a flow diagram that illustrates a process performed in the system 100 to restore a cellular telephone to connection with a telephone conference call.

Block 800 in FIG. 8A represents a conference telephone call that has been established by the system 100. It may be assumed that the conference call includes at least three participants connected by telephone to the conference telephone call. It may also be assumed that at least one of the participants is participating in the conference telephone call via a cellular telephone. Data for the conference telephone call is maintained at 314 in FIG. 3 and may include information to indicate which of the participants is participating via a cellular telephone. The conference data 314 may also indicate, with respect to each participant participating via cellular telephone, whether such participant had accepted the auto re-connect option during the establishment of the conference telephone call.

The system may monitor the progress of the conference telephone call as the conference telephone call proceeds, and may note and/or be informed when a participant drops off the telephone conference call. For example, when the signal channel to a participating cellular telephone is broken, the cellular telephone system may detect this fact in a conventional manner and may so indicate to the system 100. As used herein and in the appended claims, "detecting that a signal channel to a cellular telephone is broken" includes receiving an indication to that effect from another device or system and/or making note of such an occurrence.

During the progress of the conference telephone call, the system may, as indicated at 802, determine whether a participating cellular telephone has dropped off the telephone conference call. If a positive determination is made at 802 (i.e., if a participating cellular telephone drops off the conference telephone call), then the system may wait for a predetermined and/or programmed or configured delay or waiting period 804. Then, at the end of the delay period 804, the system may determine, at 806, whether there remain at least two participants connected to the conference telephone call. If such is the case, then the system may determine, at 808, whether the cellular telephone participant who dropped out at 802 had accepted the auto re-connect option. The latter determination may, for example, be made by referring to the conference data 314 (FIG. 3).

If a positive determination is made at 808 (i.e., if it is determined that the participant who dropped off had accepted the auto re-connect option), then, as indicated at 810 in FIG. 8B, the system may automatically initiate a telephone call to the cellular telephone of the dropped participant. Upon detecting that that telephone call is answered, the system may transmit to the cellular telephone an automatically generated voice announcement or prompt, as indicated at 812. The announcement or prompt may present to the participant an option by which the participant is permitted to indicate that the cellular telephone is to be re-connected to the conference telephone call. For example, the prompt may say, "Press 1 to be re-connected to the conference call; press 2 to decline re-connection." In addition or alternatively, the prompt may allow the user to indicate acceptance or non-acceptance of re-connection by voice input to be recognized by the system by speech recognition.

Following 812, the system may determine at 814 whether a response to the prompt is received from the participant. If so, the system may determine at 816 whether the participant's response indicated acceptance of re-connection to the conference telephone call. If a positive determination is made at 816 (i.e., if it is determined that the participant has indicated acceptance of re-connection), then the system re-connects the cellular telephone of the participant to the conference telephone call, as indicated at 818. The process then continues as before with monitoring the progress of the conference telephone call 800 (FIG. 8A).

If a negative determination is made at 816 (i.e., if the participant does not accept re-connection to the conference telephone call), then the process resumes monitoring the progress of the conference telephone call 800 without re-connecting the dropped cellular telephone to the conference telephone call.

If a negative determination is made at 814 (i.e., if no response is received from the participant, as may occur if the call does not go through or goes to voice mail), then a determination may be made at 820 as to whether a "time out" period has elapsed since the cellular telephone first dropped off the conference telephone call. If a negative determination is made at 820 (i.e., if the time out period has not elapsed), then the process may loop back to 804 and the system then may wait for another delay period before possibly once again automatically initiating a telephone call to the cellular telephone that dropped off the conference telephone call. If a positive determination is made at 820, then the process resumes monitoring the progress of the conference telephone call 800 without re-connecting the dropped cellular telephone to the conference telephone call.

If a negative determination is made at 808 (i.e., if it is determined that the dropped participant did not accept the auto re-connect option during establishment of the conference telephone call), then the process resumes monitoring the progress of the conference telephone call 800 without calling the dropped cellular telephone to try to re-connect the dropped cellular telephone to the conference telephone call. (The particular arrangements of process steps described herein with respect to the process of FIGS. 8A and 8B and/or with respect to the other flow diagrams herein or other processes described herein are not meant to imply a fixed order; embodiments can be practiced in any order that is practicable. For example, the determination at 808 may be made substantially at the same time as the determination made at 802, and if a negative determination is made at 808 the process stages at 804 and 806 may be skipped along with the process stages 810-820.)

If a negative determination is made at 806 (i.e., if it is determined after the delay period that the conference telephone call no longer has at least two participants), then the conference telephone call is determined 822 (FIG. 8A) to be over, and no attempt is made to reconnect to the dropped cellular telephone. Such a scenario may occur, for example, if the cellular telephone dropped off because the conference telephone call was adjourned and the participant having the cellular telephone intentionally rang off.

It will be appreciated that the process flow of FIGS. 8A and 8B may result in a sequence of attempts to re-connect to the dropped cellular telephone following a sequence of waiting periods. In some embodiments, the number of attempts to re-connect may be three or four, and each waiting period may be about 60 to 120 seconds. The waiting periods need not all be the same in duration. For example, the waiting periods may increase in duration after each unsuccessful attempt to re-connect to the dropped cellular telephone. It should be understood that in other embodiments, the number of waiting periods may be more or less than three or four and/or the durations of at least some of the waiting periods may be longer or shorter than 60 to 120 seconds. The "time out" period referred to in connection with decision block 820 (FIG. 8B) may be on the order of 3 to 10 minutes but may alternatively be longer or shorter.

In some embodiments, the auto re-connect feature may automatically be applied to all cellular telephones registered with the system, so that participant selection of that feature as an option for a particular conference telephone call is neither required nor permitted.

As used herein and in the appended claims, the term "re-connect telephone call" refers to a call made at 810 in FIG. 8B and/or includes a telephone call made to a cellular telephone to allow the cellular telephone to be re-connected to a conference telephone call.

As used herein and in the appended claims, "cellular telephone" includes telephones to which connection is made via satellite.

In a communication system such as that described above, in which the above-mentioned auto re-connect feature is provided, the potential disadvantage of unreliable connections to cellular telephones can be somewhat mitigated with respect to conference telephone calls by automatically calling back to a cellular telephone that drops off the conference telephone call. Consequently, it may be comparatively easy for the dropped participant via cellular telephone to be re-connected to the conference telephone call and to continue his/her participation in the conference telephone call.

It should be understood that an "automatic" call back need not necessarily be made immediately after the cellular telephone drops off. Indeed, in practice, as described hereinabove, it may be desirable to delay an automatic call back for a period of time after detecting that the signal channel to the cellular telephone is broken. Such a delay may allow the cellular telephone to experience movement from a location which lacks suitable signal coverage to a location which has suitable signal coverage.

The system described herein has various kinds of multimedia collaboration capabilities in addition to the above-described conference telephone call management functions. Nevertheless, the auto re-connect feature may be included in a system for conference telephone calling that lacks some, most or all other collaboration features. Such a system may also lack presence and other features described above.

In any conference telephone call described above or referred to in the appended claims, more than one of the participants may be participating via a cellular telephone.

Although a waiting period is preferably observed before initiating a re-connect telephone call to a cellular telephone that drops from a conference telephone call, in other embodiments an initial re-connect telephone call may be initiated immediately after the cellular telephone drops off.

Although a telecommunication system has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method of operating a conference telephone call with a conference call system, the method comprising:
   prior to the establishing of the conference telephone call:
      registering a cellular telephone with the conference call system;
      presenting to a user of the cellular telephone via the cellular telephone an option by which the user of the cellular telephone is permitted to (i) indicate that the cellular telephone is to be automatically called back to re-connect to the conference telephone call if a signal channel to the cellular telephone is broken during the conference telephone call and (ii) indicate that the cellular telephone is to not be automatically called back to re-connect to the conference telephone call if the signal channel to the cellular telephone is broken during the conference telephone call, and
      wherein the presenting comprises transmitting an automatically generated voice prompt to the user of the cellular telephone via the cellular phone;
   establishing the conference telephone call, the conference telephone call having at least three participants, one of the participants participating in the conference telephone call being the user of the cellular telephone;
   during the conference telephone call, detecting that the signal channel to the cellular telephone is broken; and
   the conference call system automatically responding to the detecting that the signal channel to the cellular telephone is broken by initiating a re-connect telephone call to the cellular telephone to re-connect the cellular telephone to the conference telephone call if the user of the cellular telephone indicated that the cellular telephone is to be automatically called back and by not initiating a re-connect the cellular telephone to the conference telephone call if the user of the cellular telephone indicated that the cellular telephone is to not be automatically called back.

2. A method according to claim 1, wherein the automatically responding is performed after a pre-determined delay period following the detecting step, and only if at least two participants remain connected to the conference telephone call at an end of the pre-determined delay period.

3. A method according to claim 1, further comprising:
   after initiating the re-connect telephone call, presenting to said one of the participants an option by which said participant is permitted to indicate that the cellular telephone is to be re-connected to the conference telephone call.

4. A method according to claim 1, further comprising:
   said prior to the establishing of the telephone conference call:
      indicating to the system that the cellular telephone is a cellular telephone; and
      indicating to the system that said one of the participants is to be contacted via the cellular telephone.

5. A conference call system comprising:
   conference means for establishing a conference telephone call, the conference telephone call having at least three participants, one of the participants participating in the conference telephone call via a cellular telephone, wherein prior to establishing a conference telephone call: registering a cellular telephone with the conference call system, and presenting to the one of the participants participating in the conference telephone call via a cellular telephone via the cellular telephone an option by which the participant is permitted to (i) indicate that the cellular telephone is to be automatically called back to re-connect to the conference telephone call if a signal channel to the cellular telephone is broken during the conference telephone call and (ii) indicate that the cellular telephone is to not be automatically called back to re-connect to the conference telephone call if the signal channel to the cellular telephone is broken during the conference telephone call, and wherein the presenting comprises transmitting an automatically generated voice prompt to the participant of the cellular telephone via the cellular phone;
   detecting means, responsive to the conference means, for detecting that a signal channel to the cellular telephone is broken during the conference telephone call; and
   re-connect means, responsive to the detecting means, for automatically initiating a re-connect telephone call to the cellular telephone to re-connect the cellular telephone to the conference telephone calls if the participant participating in the conference telephone call via a cellular telephone indicated that the cellular telephone is to be automatically called back and by not automatically initiating a re-connect telephone call to the cellular telephone if the participant participating in the conference telephone call via a cellular telephone indicated that the cellular telephone is to not be automatically called back.

6. A conference call system according to claim 5, wherein the re-connect means initiates the re-connect telephone call after a pre-determined delay period following the detecting means detecting that the signal channel to the cellular telephone is broken, and only if at least two participants remain connected to the conference telephone call at an end of the pre-determined delay period.

7. A conference call system according to claim 5, wherein said re-connect means includes means for presenting to said one of the participants an option by which said participant is permitted to indicate in response to said re-connect telephone call that the cellular telephone is to be re-connected to the conference telephone call.

8. A conference call system according to claim 5, further comprising:
   means for indicating to the system that the cellular telephone is a cellular telephone; and
   means for indicating to the system that said one of the participants is to be contacted via the cellular telephone.

9. A conference call system comprising:
   a processor; and
   a memory coupled to the processor and storing instructions to cause the processor to:
   prior to the establishing of a conference telephone call:
      register a cellular telephone with the conference call system;
      present to a user of the cellular telephone via the cellular telephone an option by which the user of the cellular telephone is permitted to (i) indicate that the cellular telephone is to be automatically called back to re-connect to the conference telephone call if a signal channel to the cellular telephone is broken during the conference telephone call and (ii) indicate that the cellular telephone is to not be automatically called back to re-connect to the conference telephone call if the signal channel to the cellular telephone is broken during the conference telephone call, and
      wherein to present to the user of the cellular telephone comprises transmitting an automatically generated voice prompt to the user of the cellular telephone via the cellular phone;
   establish the conference telephone call, the conference telephone call having at least three participants, one of the participants participating in the conference telephone call being the user of the cellular telephone;
   during the conference telephone call, detect that the signal channel to the cellular telephone is broken; and
   the conference call system to automatically respond to the detecting that the signal channel to the cellular telephone is broken by initiating a re-connect telephone call to the cellular telephone to re-connect the cellular telephone to the conference telephone call if the user of the cellular telephone indicated that the cellular telephone is to be automatically called back and by not initiating a re-connect the cellular telephone to the conference telephone call if the user of the cellular telephone indicated that the cellular telephone is to not be automatically called back.

10. A conference call system according to claim 9, wherein the processor initiates the re-connect telephone call after a pre-determined delay period following the detecting step, and only if at least two participants remain connected to the conference telephone call at an end of the pre-determined delay period.

11. A conference call system according to claim 9, wherein, after initiating the re-connect telephone call, the processor presents to said one of the participants an option by which said participant is permitted to indicate that the cellular telephone is to be re-connected to the conference telephone call.

12. An apparatus for managing a conference telephone call with a conference call system comprising:
   a computer storage device having a computer program embodied therein for managing a telephone conference call, the computer program in said apparatus comprising:
   means for establishing a conference telephone call, the conference telephone call having at least three participants, one of the participants participating in the conference telephone call via a cellular telephone, wherein prior to establishing a conference telephone call: registering a cellular telephone with the conference call system, and presenting to the one of the participants participating in the conference telephone call via a cellular telephone via the cellular telephone an option by which the participant is permitted to (i) indicate that the cellular telephone is to be automatically called back to re-connect to the conference telephone call if a signal channel to the cellular telephone is broken during the conference telephone call and (ii) indicate that the cellular telephone is to not be automatically called back to re-connect to the conference telephone call if the signal channel to the cellular telephone is broken during the conference telephone call, and wherein the presenting comprises transmitting an automatically generated voice prompt to the participant of the cellular telephone via the cellular phone;
   means for detecting that a signal channel to the cellular telephone is broken during the conference telephone call; and
   means for automatically responding to the detecting that the signal channel to the cellular telephone is broken initiating a re-connect telephone call to the cellular telephone to re-connect the cellular telephone to the conference telephone call if the participant participating in the conference telephone call via a cellular telephone indicated that the cellular telephone is to be automatically called back and by not automatically initiating a re-connect telephone call to the cellular telephone if the participant participating in the conference telephone call via a cellular telephone indicated that the cellular telephone is to not be automatically called back.

* * * * *